(12) United States Patent
Paschalakis et al.

(10) Patent No.: US 7,840,081 B2
(45) Date of Patent: Nov. 23, 2010

(54) METHODS OF REPRESENTING AND ANALYSING IMAGES

(75) Inventors: Stavros Paschalakis, Guildford (GB); Miroslaw Bober, Guildford (GB)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1102 days.

(21) Appl. No.: 11/231,896

(22) Filed: Sep. 22, 2005

(65) Prior Publication Data

US 2006/0093215 A1    May 4, 2006

(30) Foreign Application Priority Data

Sep. 23, 2004   (GB)   ................... 0421219.7
Aug. 5, 2005    (EP)   ................... 05254923

(51) Int. Cl.
*G06K 9/36* (2006.01)

(52) U.S. Cl. ............... 382/236; 707/763; 348/415.1

(58) Field of Classification Search ........... 382/173, 382/100, 112, 209, 217, 218, 219, 220, 221, 382/232, 236, 266, 267, 268, 269, 305, 769; 707/705, 708, 713, 763, 769; 348/400.1–421.1
See application file for complete search history.

(56) References Cited

U.S. PATENT DOCUMENTS

| | | | |
|---|---|---|---|
| 6,542,619 B1 | 4/2003 | Jafarkhani et al. | |
| 2003/0091235 A1 | 5/2003 | Xiong | |
| 2003/0194126 A1 | 10/2003 | Shin et al. | |
| 2004/0091044 A1 | 5/2004 | Nakajima et al. | |
| 2006/0093215 A1* | 5/2006 | Paschalakis et al. | ......... 382/173 |

FOREIGN PATENT DOCUMENTS

WO    WO-00/67203 A1    11/2000

OTHER PUBLICATIONS

"Text of ISO/IEC 15938-3/FCD Information Technology—Multimedia Content Description Interface—Part 3 Visual", *ISO/IEC JTC1/SC29/WG11/N4062*, Mar. 2001, pp. 1-93, XP00100412.
Manjunath B S et al: "Color and Texture Descriptors", *IEEE Transactions on Circuits and Systems for Video Technology*, IEEE Service Centers, vol. 11, No. 6 Jun. 2001, pp. 703-715, XP001059862.
Porikli F ED—Institute of Electrical and Electronics Engineers: "Automatic threshold determination of centroid-linkage region growing by MPEG-7 dominant color descriptors.", *Proceedings 2002 International Conference on Image Processing,. ICIP 2002.*, Rochester, NY, Sep. 22-25, 2002, International Conference on Image Processing, New York, NY, IEEE, US, vol. 2 of 3, Sep. 2002, pp. 793-796, XP010607443.

(Continued)

*Primary Examiner*—Anand Bhatnagar
(74) *Attorney, Agent, or Firm*—Birch, Stewart, Kolasch & Birch, LLP.

(57) ABSTRACT

A method of representing at least one image comprises deriving at least one descriptor based on color information and color interrelation information for at least one region of the image, the descriptor having at least one descriptor element, derived using values of pixels in said region, wherein at least one descriptor element for a region is derived using a non-wavelet transform. The representations may be used for image comparisons.

32 Claims, 5 Drawing Sheets

OTHER PUBLICATIONS

Wang et al., (Jul. 27, 2003), "Image retrieval using block-based color distribution", pp. 445-450.

Laaksonen et al., (Dec. 1, 2000), "PicSOM—content based image retrieval with self-organizing maps", pp. 1199-1207.

Veltkamp et al. (Oct. 28, 2002), "Content-based image retrieval systems: A survey", pp. 1-62.

Di Sciascio et al. (1999), "Content-based image retrieval over the Web using query by sketch and relevance feedback", pp. 123-130.

Dailianas et al., "Comparison of Automatic Video Segmentation Algorithms," *SPIE Integration Issues in Large Commercial Media Delivery Systems*, vol. 2615, Oct. 1995, pp. 2-16.

Lienhart, Rainer, "Comparison of Automatic Shot Boundary Detection Algorithms," *In Proceedings of Image and Video Processing VII 1999*, Proc. SPIE 3656-29, Jan. 1999, pp. 290-301.

Zhuang et al., "Efficient Multiresolution Scene Change Detection by Wavelet Transformation," *Proc. ICCE'97*, Jun. 1997, pp. 250-251.

Jacobs et al., "Fast Multiresolution Image Querying," *In Proceedings of 1995 ACM SIGGRAPH Conference*, Los Angeles, Aug. 1995, pp. 277-286.

Zabih et al., "A Feature-Based Algorithm for Detecting and Classifying Scene Breaks," *In Proceedings of 1995 3rd ACM International Conference on Multimedia*, San Francisco, 1995, pp. 189-200.

\* cited by examiner $F^Y_{i\,(64\times64)}$

Figure 2A $F^Y_{i\,(64\times64)}$

Figure 2B $F^Y_{i\,(64\times64)}$

Figure 2C $F^Y_{i\,(64\times64)}$

Figure 2D $F^Y_{i\,(64\times64)}$

Figure 3A $F^Y_{i\,(64\times64)}$

Figure 3B $F^Y_{i\,(64\times64)}$

Figure 3C $F^Y_{i\,(64\times64)}$

Figure 3D

METHODS OF REPRESENTING AND ANALYSING IMAGES

The invention relates to a method and apparatus for representing an image or group of images, and a method and apparatus for comparing images, eg for detecting discontinuities in image sequences or for image retrieval.

In Lienhart, R., "Comparison of Automatic Shot Boundary Detection Algorithms", *In Proceedings of Image and Video Processing VII* 1999, Proc. SPIE 3656-29, pp. 290-301, January 1999, a method is presented for the detection of shot transitions in a video sequence. For each frame in the sequence, a 3-dimensional histogram in the RGB colour space is created. The difference between consecutive frames in the sequence is then calculated as the difference between their respective histograms, calculated as the sum of absolute bin-wise differences. Shot transitions are then identified by searching for the distances which are above a predetermined fixed threshold. Thus, this method detects shot transitions based solely on spatially insensitive colour content information. Therefore, this method does not make use of the wealth of information that is present in the spatial arrangement and interrelations of colours.

In Zabih, R., Miller, J., Mai, K., "A Feature-Based Algorithm for Detecting and Classifying Scene Breaks", *In Proceedings of 1995 $3^{rd}$ ACM International Conference on Multimedia,* San Francisco, Calif. USA, pp. 189-200, 1995, a different method is presented for the detection of shot transitions in a video sequence. For each frame in the sequence, an edge map is calculated. The difference between consecutive frames in the sequence is then calculated based on the number of edges which are present in the first frame but not in the second and the number of edges which are present in the second frame but not in the first. Then, sharp peaks in the time series of this difference measure indicate the presence of a shot transition. Thus, this method detects shot transitions based solely on edge information, which is one type of spatial interrelation information. Although the rationale is correct, this method does not make use of the wealth of information that is present in the colour content of the frame. Furthermore, the edge map creation process is computationally expensive and is meant to reveal only the strongest colour discontinuities within the frame. Furthermore, the method is quite sensitive to motion. Thus, the authors suggest the use of an image registration technique to counteract this shortcoming, but such processes are computationally expensive.

In Dailianas, A., Allen, R. B., England, P., "Comparison of Automatic Video Segmentation Algorithms", *SPIE Integration Issues in Large Commercial Media Delivery Systems,* vol. 2615, pp. 2-16, October 1995, another method is presented for the detection of shot transitions in a video sequence. The difference between consecutive frames in the sequence is calculated as the sum of absolute pixel-wise differences. Shot transitions are then identified by searching for the distances which are above a predetermined fixed threshold. Thus, this method detects shot transitions based solely on spatially sensitive colour content information. Although the rationale is correct, this method does not make use of the wealth of information that is present in the spatial interrelations of colours. Furthermore, such a simple processing of the video results in high sensitivity to noise and motion. A motion compensation algorithm could address the motion sensitivity problem, but such processes are computationally expensive.

In Xiong, W., "Shot Boundary Detection", US 2003/0091235 A1, Published May 15, 2003, Filed Nov. 9, 2001, a method is presented for the detection of shot transitions based on the combination of different types of information. That method comprises calculating a block-based difference between two frames and, if it exceeds a fixed threshold, declaring a candidate shot transition. In this case, the shot transition is verified by requiring that colour and/or edge differences between the two frames also exceed fixed thresholds. For the calculation of the block-based difference, the frames are divided into blocks and block averages are calculated. Then, the difference between corresponding blocks is thresholded to determine if two blocks are similar or different, and the number of different blocks between two frames is thresholded to determine if two frames are similar or different. The colour difference is the sum of absolute bin-wise differences, while the edge difference uses edge histograms, capturing edge magnitude and direction information.

In Nakajima, Y., Sugano, M., Yanagihara, H., for KDDI CORPORATION (JP), "Picture Searching Apparatus", US 2004/0091044 A1, Published May 13, 2004, Filed Aug. 15, 2003, Priority Sep. 20, 2002, a method is presented for the detection of shot transitions based on (a) correlation between images, (b) correlation between subsampled images, (c) motion between images and (d) motion between subsampled images. There, the correlation between images and between subsampled images is measured as a pixel-wise difference or a histogram difference and the motion between images and between subsampled images is measured based on various motion vector differences.

In Jafarkhani, H., Shahraray, B., for AT&T CORP. (US), "Method for Analyzing Video", U.S. Pat. No. 6,542,619 B1, patent Apr. 1, 2003, Filed Apr. 13, 2000, a shot transition detection method is presented which comprises creating two one dimensional projections of a video frame, i.e. row and column projections, performing a wavelet transform on each projection and retaining only the high frequency components (i.e. the wavelet coefficients), and auto-correlating the high frequency components of each transform. For a series of video frames, a shot transition is indicated when the resultant auto-correlation coefficient time curves exhibit a predetermined maximum value. Thus, that method employs spatially sensitive colour content and interrelation information, provided by the wavelet transform, but that information relates not to frames but to frame projections, resulting is great information loss.

In Jacobs, C. E., Finkelstein, A., Salesin, D. H., "Fast Multiresolution Image Querying", *In Proceedings of 1995 ACM SIGGRAPH Conference,* Los Angeles Calif., USA, August 9-11, pp. 277-286, 1995, a method for retrieving images similar to a given image is presented. With that method images are initially represented by their Haar wavelet decomposition. Then, this decomposition is truncated, i.e. only the scaling function coefficient (average intensity) and a very small number of the largest magnitude Haar wavelet coefficients are retained. Then, the truncated decomposition is quantised, i.e. only the signs of the wavelet coefficients are retained. Thus, a single image descriptor is formed that characterises the image for the purposes of image retrieval.

In Zhuang, Z.-Y., Hsu, C.-T., Chen, H.-Y., Ouhyoung, M., Wu, J.-L., "Efficient Multiresolution Scene Change detection by Wavelet Transformation", *In Proceedings of 1997 IEEE International Conference on Consumer Electronics ICCE '97,* Taipei, Taiwan, June 11-13, pp. 250-251, 1997, a method for the detection of shot transitions is proposed that proceeds to characterise video frames in the same manner described in Jacobs, C. E., Finkelstein, A., Salesin, D. H., "Fast Multiresolution Image Querying", *In Proceedings of 1995 ACM SIGGRAPH Conference,* Los Angeles Calif., USA, August 9-11, pp. 277-286, 1995. The difference between the methods of Jacobs, C. E., Finkelstein, A., Salesin, D. H., "Fast Multiresolution Image Querying", *In Proceedings of 1995 ACM SIGGRAPH Conference*, Los Angeles Calif., USA, August 9-11, pp. 277-286, 1995 and Zhuang, Z.-Y., Hsu, C.-T., Chen, H.-Y., Ouhyoung, M., Wu, J.-L., "Efficient Multiresolution Scene Change detection by Wavelet Transformation", *In Proceedings of 1997 IEEE International Conference on Consumer Electronics ICCE '97*, Taipei, Taiwan, June 11-13, pp. 250-251, 1997 is that with the method of Zhuang, Z.-Y., Hsu, C.-T., Chen, H.-Y., Ouhyoung, M., Wu, J.-L., "Efficient Multiresolution Scene Change detection by Wavelet Transformation", *In Proceedings of 1997 IEEE International Conference on Consumer Electronics ICCE '97*, Taipei, Taiwan, June 11-13, pp. 250-251, 1997 the perimeter of frames is discarded and frames are reduced to only their central parts. Such an approach leads to great information loss and can result in false video segmentation and/or great over-segmentation when significant motion is present in the video.

A deficiency that is common with both the methods of Jacobs, C. E., Finkelstein, A., Salesin, D. H., "Fast Multiresolution Image Querying", *In Proceedings of 1995 ACM SIGGRAPH Conference*, Los Angeles Calif., USA, August 9-11, pp. 277-286, 1995 and Zhuang, Z.-Y., Hsu, C.-T., Chen, H.-Y., Ouhyoung, M., Wu, J.-L., "Efficient Multiresolution Scene Change detection by Wavelet Transformation", *In Proceedings of 1997 IEEE International Conference on Consumer Electronics ICCE '97*, Taipei, Taiwan, June 11-13, pp. 250-251, 1997 is the assumption that the Haar decomposition can be efficiently truncated by retaining only a very small number of the largest magnitude coefficients. To put this in context, a multi-scale Haar decomposition of an image plane starting at 128×128 pixels down to 2×2 pixels produces 16383 coefficients. For the purposes of image retrieval or video processing, such a feature vector may indeed be too large for a fast and efficient implementation. However, truncating this vector to a very small number of coefficients on the basis of magnitude, e.g. the 40 or 60 coefficients with the largest magnitude as the authors suggest, is a mechanical way or reducing its dimensionality and, as those skilled in the art know, results in descriptors which give a spatially non-uniform representation of the image, are extremely susceptible to noise, are also very susceptible to high video motion and intra-shot lighting effects for video segmentation, to name a few problems. Quantising the truncated series by retaining only the signs amplifies the problem.

Another drawback with the methods of Jacobs, C. E., Finkelstein, A., Salesin, D. H., "Fast Multiresolution Image Querying", *In Proceedings of 1995 ACM SIGGRAPH Conference*, Los Angeles Calif., USA, August 9-11, pp. 277-286, 1995 and Zhuang, Z.-Y., Hsu, C.-T., Chen, H.-Y., Ouhyoung, M., Wu, J.-L., "Efficient Multiresolution Scene Change detection by Wavelet Transformation", *In Proceedings of 1997 IEEE International Conference on Consumer Electronics ICCE '97*, Taipei, Taiwan, June 11-13, pp. 250-251, 1997 is that the calculation of the Haar decomposition entails an increased amount of computations, due to the fact that the coefficients for an image region are computed based on all the pixel values within that region.

Here, we propose methods for assessing the similarity between images, for example for the retrieval of images from a set of images that are similar to a given image or for the detection of frame discontinuities, such as shot transitions or lighting and other effects, in digital video. The methods rely on the extraction of image descriptors capturing spatially sensitive colour content and interrelation information at one or more image scales and across one or more image channels. One characteristic of the methods is that, unlike the previous methods, the descriptors may be extracted so that they capture spatially sensitive colour content and interrelation information uniformly across the image planes and at multiple scales, but have a reduced size compared to the aforementioned Haar decomposition, thus reducing the need for an artificial truncation process. Another characteristic of the methods is that, unlike the previous methods, the descriptors may be extracted so that they allow perfect reconstruction of the original image, but have a reduced computational load compared to the aforementioned Haar decomposition.

In view of the above, an object of the invention is to provide an improved method for assessing the similarity between images, for example for the retrieval of images from a set of images that are similar to a given image or for the detection of frame discontinuities, such as shot transitions or lighting and other effects, in digital video.

For video segmentation, the proposed methodology allows the representation of both uncompressed and MPEG compressed digital video frames. For the latter, I frames can be represented without decompression.

Aspects of the invention are set out in the accompanying claims.

Features of an embodiment include:

(i) extraction of image descriptors capturing spatially sensitive colour content and interrelation information at one or more image scales and across one or more image channels, the descriptor of at least one scale-specific channel-specific image representation characterised by all the regional descriptor elements of at least one descriptor element type being calculated using only a subset of the pixels of the respective regions.

and/or the pixels used in the calculation of all the regional descriptor elements of all descriptor element types being only a subset of the pixels of the respective regions.

and/or the total number of descriptor elements being less than the number of pixels of said representation, said property being inherent in the descriptor extraction process without reliance on any post-processing of the descriptors, for example truncation;

(ii) combining said descriptors in a single multi-scale multi-channel descriptor; and (iii) use of the resultant descriptors in assessing the similarity between images.

Specific embodiments of the invention are outlined below, with reference to the accompanying drawings, of which:

FIG. 1 illustrates the block averaging resampling process for the Y channel according to an embodiment of the invention;

FIGS. 2 A-D illustrate the calculation of the descriptor for a scale in one embodiment of the invention;

FIGS. 3 A-D illustrate the calculation of the descriptor for a scale according to a further embodiment of the invention;

A first embodiment of the invention relates to descriptor extraction.

Figure 1:
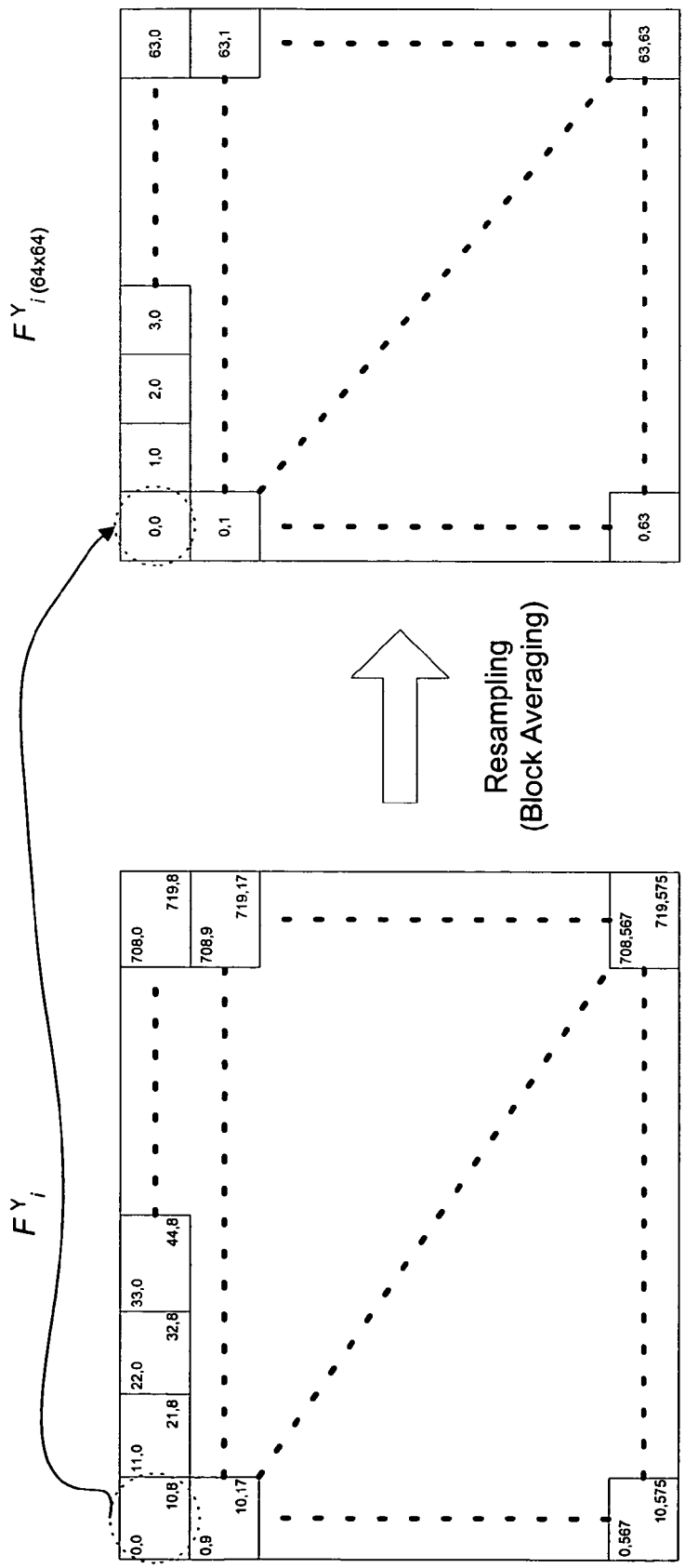

Consider a digital image $F_i(x,y)$ where $(x,y)$ represent spatial coordinates, with $x=0 \ldots M-1$ and $y=0 \ldots N-1$. In one embodiment of the invention, $F_i$ is represented in the colour space $YC_bC_r$, although this is not restrictive and the invention is applicable to any colour space of any number of channels. In one embodiment of the invention, the spatial resolution of $F_i$ is 720×576 pixels, i.e. M=720 and N=576, although this is not restrictive and the invention is applicable to any spatial resolution. In one embodiment of the invention, the highest resolution at which the descriptor is to be extracted is chosen to be 64×64 pixels, although this is not restrictive and the invention is applicable to other resolutions. Thus, $F_i$ is resampled to give the 64×64 pixel image $F_{i(64\times64)}$. In one embodiment of the invention, this resampling process is a simple block averaging process as shown in FIG. 1, although the choice of the resampling mechanism is not restrictive. More specifically, FIG. 1 illustrates the block averaging resampling process for the Y channel, although this is not restrictive and the process can be used for any channel of any colour space. In another embodiment of the invention, the highest scale at which a descriptor is to be extracted coincides with the resolution of $F_i$ and no resampling is initially required.

FIG. 2 illustrates the calculation of the descriptor for this scale in one embodiment of the invention. More specifically, FIG. 2 illustrates the calculation of the descriptor for the Y channel, although this is not restrictive and a similar approach is applied to all colour channels. In FIG. 2A a 2×2 window is applied to the top left corner of the image. This window specifies a local neighbourhood. For the pixels in this neighbourhood $F^Y_{i(64\times64)}(0,0)$, $F^Y_{i(64\times64)}(1,0)$, $F^Y_{i(64\times64)}(0,1)$ and $F^Y_{i(64\times64)}(1,1)$ the descriptor elements $\chi_1$ to $\chi_4$ can be calculated as:

$$\chi_1 = (F^Y_{i(64\times64)}(0,0) + F^Y_{i(64\times64)}(1,0) + F^Y_{i(64\times64)}(0,1) + F^Y_{i(64\times64)}(1,1))/4 \quad (1)$$

$$\chi_2 = (F^Y_{i(64\times64)}(0,0) - F^Y_{i(64\times64)}(1,0))/2 \quad (2)$$

$$\chi_3 = (F^Y_{i(64\times64)}(1,0) - F^Y_{i(64\times64)}(1,1))/2 \quad (3)$$

$$\chi_4 = (F^Y_{i(64\times64)}(1,1) - F^Y_{i(64\times64)}(0,1))/2 \quad (4)$$

In the equations above, the element $\chi_1$ captures colour content information, while the elements $\chi_2$, $\chi_3$ and $\chi_4$ capture colour interrelation information.

Denoting $V^Y_{i(64\times64)}$ the descriptor of $F^Y_{i(64\times64)}$, these values are written into the descriptor as $$V^Y_{i(64\times64)}(1) = \chi_1, V^Y_{i(64\times64)}(2) = \chi_2, V^Y_{i(64\times64)}(3) = \chi_3, V^Y_{i(64\times64)}(4) = \chi_4 \quad (5)$$

Next, as shown in FIG. 2B, the 2×2 window slides two pixels to the right to form a new neighbourhood comprising pixels $F^Y_{i(64\times64)}(2,0)$, $F^Y_{i(64\times64)}(3,0)$, $F^Y_{i(64\times64)}(2,1)$ and $F^Y_{i(64\times64)}(3,1)$. The descriptor elements $\chi_1$ to $\chi_4$ are again calculated for the new pixel values and then stored in the descriptor positions $V^Y_{i(64\times64)}(5)$ to $V^Y_{i(64\times64)}(8)$. As shown in FIGS. 2C and 2D once all the calculations for a set of rows are completed, the sliding window moves two pixels down and again starts sliding from left to right, until the entire image has been processed. This completes the calculation of the descriptor $V^Y_{i(64\times64)}$ which captures the image's spatially sensitive colour content and interrelations, for the Y plane at a scale of 64×64 pixels.

The invention outlined here comprises calculating descriptors that capture spatially sensitive colour content and interrelation information.

Another embodiment replaces descriptor elements $\chi_1$ to $\chi_4$ with descriptor elements $\psi_1$ and $\psi_2$ derived as set out below:

$$\psi_1 = (F^Y_{i(64\times64)}(0,0) + F^Y_{i(64\times64)}(1,0) + F^Y_{i(64\times64)}(0,1) + F^Y_{i(64\times64)}(1,1))/4 \quad (I)$$

$$\psi_2 = \max(F^Y_{i(64\times64)}(0,0), F^Y_{i(64\times64)}(1,0), F^Y_{i(64\times64)}(0,1), F^Y_{i(64\times64)}(1,1)) - \min(F^Y_{i(64\times64)}(0,0), F^Y_{i(64\times64)}(1,0), F^Y_{i(64\times64)}(0,1), F^Y_{i(64\times64)}(1,1)) \quad (II)$$

In the equations (I) and (II) shown above, $\psi_1$ captures colour content information while $\psi_2$ captures colour interrelation information. The number of descriptor elements is less than the number of pixels used to derive the descriptor elements.

Yet another embodiment replaces descriptor elements $\chi_1$ to $\chi_4$ with descriptor elements $\phi_1$-$\phi_4$ derived as set out below:

$$\phi_1 = (F^Y_{i(64\times64)}(0,0) + F^Y_{i(64\times64)}(1,0) + F^Y_{i(64\times64)}(0,1) + F^Y_{i(64\times64)}(1,1))/4 \quad (III)$$

$$\phi_2 = (F^Y_{i(64\times64)}(0,0) - F^Y_{i(64\times64)}(1,0))/2 \quad (IV)$$

$$\phi_3 = (F^Y_{i(64\times64)}(0,0) - F^Y_{i(64\times64)}(1,1))/2 \quad (V)$$

$$\phi_4 = (F^Y_{i(64\times64)}(0,0) - F^Y_{i(64\times64)}(0,1))/2 \quad (VI)$$

In the equations (III)-(VI) shown above, $\phi_1$ captures colour content information while $\phi_2$-$\phi_4$ captures colour interrelation information.

In another embodiment of the invention descriptor elements are extracted according to the scheme of FIG. 3. In FIG. 3A a 4×4 window is applied to the top left corner of the image. This window specifies a local neighbourhood comprising 16 pixels. For the pixels in this neighbourhood the following descriptor elements are calculated $$\psi_1 = (F^Y_{i(64\times64)}(0,0) + F^Y_{i(64\times64)}(1,0) + F^Y_{i(64\times64)}(2,0) + F^Y_{i(64\times64)}(3,0) + \\ F^Y_{i(64\times64)}(0,1) + F^Y_{i(64\times64)}(1,1) + F^Y_{i(64\times64)}(2,1) + \\ F^Y_{i(64\times64)}(3,1) + F^Y_{i(64\times64)}(0,2) + F^Y_{i(64\times64)}(1,2) + \\ F^Y_{i(64\times64)}(2,2) + F^Y_{i(64\times64)}(3,2) + F^Y_{i(64\times64)}(0,3) + \\ F^Y_{i(64\times64)}(1,3) + F^Y_{i(64\times64)}(2,3) + F^Y_{i(64\times64)}(3,3))/16 \quad (6)$$

$$\psi_2 = (F^Y_{i(64\times64)}(0,0) + F^Y_{i(64\times64)}(1,0) + F^Y_{i(64\times64)}(2,0) + F^Y_{i(64\times64)}(3,0) - \\ F^Y_{i(64\times64)}(0,1) - F^Y_{i(64\times64)}(1,1) - F^Y_{i(64\times64)}(2,1) - \\ F^Y_{i(64\times64)}(3,1) - F^Y_{i(64\times64)}(0,2) - F^Y_{i(64\times64)}(1,2) - \\ F^Y_{i(64\times64)}(2,2) - F^Y_{i(64\times64)}(3,2) + F^Y_{i(64\times64)}(0,3) + \\ F^Y_{i(64\times64)}(1,3) + F^Y_{i(64\times64)}(2,3) + F^Y_{i(64\times64)}(3,3))/16 \quad (7)$$

$$\psi_3 = (F^Y_{i(64\times64)}(0,0) - F^Y_{i(64\times64)}(1,0) - F^Y_{i(64\times64)}(2,0) + F^Y_{i(64\times64)}(3,0) + \\ F^Y_{i(64\times64)}(0,1) - F^Y_{i(64\times64)}(1,1) - F^Y_{i(64\times64)}(2,1) + \\ F^Y_{i(64\times64)}(3,1) + F^Y_{i(64\times64)}(0,2) - F^Y_{i(64\times64)}(1,2) - \\ F^Y_{i(64\times64)}(2,2) + F^Y_{i(64\times64)}(3,2) + F^Y_{i(64\times64)}(0,3) - \\ F^Y_{i(64\times64)}(1,3) - F^Y_{i(64\times64)}(2,3) + F^Y_{i(64\times64)}(3,3))/16 \quad (8)$$

$$\psi_4 = \max(F^Y_{i(64\times64)}(0,0), F^Y_{i(64\times64)}(1,0), F^Y_{i(64\times64)}(2,0), F^Y_{i(64\times64)}(3,0), \\ F^Y_{i(64\times64)}(0,1), F^Y_{i(64\times64)}(1,1), F^Y_{i(64\times64)}(2,1), F^Y_{i(64\times64)}(3,1), \\ F^Y_{i(64\times64)}(0,2), F^Y_{i(64\times64)}(1,2), F^Y_{i(64\times64)}(2,2), F^Y_{i(64\times64)}(3,2), \\ F^Y_{i(64\times64)}(0,3), F^Y_{i(64\times64)}(1,3), F^Y_{i(64\times64)}(2,3), F^Y_{i(64\times64)}(3,3)) - \\ \min(F^Y_{i(64\times64)}(0,0), F^Y_{i(64\times64)}(1,0), F^Y_{i(64\times64)}(2,0), F^Y_{i(64\times64)}(3,0), \\ F^Y_{i(64\times64)}(0,1), F^Y_{i(64\times64)}(1,1), F^Y_{i(64\times64)}(2,1), F^Y_{i(64\times64)}(3,1), \\ F^Y_{i(64\times64)}(0,2), F^Y_{i(64\times64)}(1,2), F^Y_{i(64\times64)}(2,2), F^Y_{i(64\times64)}(3,2), \\ F^Y_{i(64\times64)}(0,3), F^Y_{i(64\times64)}(1,3), F^Y_{i(64\times64)}(2,3), F^Y_{i(64\times64)}(3,3)) \quad (9)$$

In the equations above, $\psi_1$ captures colour content information and $\psi_2$, $\psi_3$ and $\psi_4$ capture colour interrelation information. Those skilled in art will understand that the equations (6)-(9) may be modified to reduce the number of required calculations.

These values may be written into the descriptor $V^Y_{i(64\times64)}$ along the lines of equation (5) and then, as shown in FIG. 3B, the 4×4 window slides four pixels to the right to form a new neighbourhood, descriptor elements are again calculated for the new pixel values, and so on. As shown in FIGS. 3C and 3D once all the calculations for a set of rows are completed, the sliding window moves two pixels down and again starts sliding from left to right, until the entire image has been processed.

In alternate embodiments of the invention, the calculation of colour content and/or interrelation descriptor elements may rely on functions of the neighbourhood pixels such as the median, the maximum, the minimum, etc.

Furthermore, although the previous descriptions consider sliding neighbourhood windows of size 2×2 and 4×4 pixels, this is not restrictive. Alternative embodiments can specify any size and/or a geometry and/or a sliding step for the neighbourhood window, resulting in overlapping or non-overlapping windows, for example to suit given computational needs or the neighbourhood measurement process itself.

In the previous descriptions, the same neighbourhood window and descriptor extraction process are used at all locations of $F^Y_{i(64 \times 64)}$. In alternative implementations this need not be so. Alternative embodiments may employ different neighbourhood parameters and/or descriptor extraction processes at different locations in the image. For example, an alternative embodiment of the invention uses a fast descriptor extraction process at the perimeter of the image and a slower but more powerful descriptor extraction process at the centre of the image.

Next, $F^Y_{i(64 \times 64)}$ is resampled to a new lower scale. In one embodiment, this new scale is 32×32 pixels. Then, the new descriptor $V^Y_{i(32 \times 32)}$ is calculated in exactly the same manner as for the 64×64 image. Note that it may be the case that no computations are actually required for this resampling. As can be seen in equation (1), the new pixel values were calculated earlier as $\chi_1$ values and are stored in $V^Y_{i(64 \times 64)}(1)$, $V^Y_{i(64 \times 64)}(5)$, $V^Y_{i(64 \times 64)}(9)$, ..., $V^Y_{i(64 \times 64)}(4093)$. Thus, in one embodiment, the descriptors $V^Y_{i(64 \times 64)}$, $V^Y_{i(32 \times 32)}$, $V^Y_{i(16 \times 16)}$, $V^Y_{i(8 \times 8)}$, $V^Y_{i(4 \times 4)}$, and $V^Y_{i(2 \times 2)}$ are calculated.

The invention outlined here comprises extracting descriptors at one or more scales of the image $F_i$. In the previous descriptions, the finest or maximum or highest scale, the coarsest or minimum or lowest scale, the number of scales and the relation between scales, are representative of only one possible embodiment of the invention and alternative embodiments may employ different such parameters in order, for example, to match the computational capabilities of a system.

In one embodiment of the invention, certain elements are removed from these scale-specific descriptors before subsequent processing. In one embodiment of the invention, for the descriptor extraction process outlined in equations (1)-(4) at scales $2^b \times 2^b$, $2^{b-1} \times 2^{b-1}$, $2^{b-2} \times 2^{b-2}$ and so on, e.g. 64×64, 32×32, 16×16, and so on, all the $\chi_1$ elements in $V^Y_i$ may be removed except for the $\chi_1$ elements at the lowest scale. This is because the $\chi_1$ elements at scale $2^{b-k} \times 2^{b-k}$ can be directly calculated from the $\chi_1$ values at scale $2^{b-k-1} \times 2^{b-k-1}$ and the $\chi_2$, $\chi_3$, and $\chi_4$ elements at scale $2^{b-k} \times 2^{b-k}$. Note that this property will not always hold. For example, it will not apply if the descriptors are calculated at scales $2^b \times 2^b$, $2^{b-2} \times 2^{b-2}$, $2^{b-4} \times 2^{b-4}$ and so on, e.g. 64×64, 16×16, 4×4, and so on. Also, it will not hold if only a subset of the $\chi_1, \chi_2, \chi_3$ and $\chi_4$ elements are calculated as part of the descriptor extraction process. The same property applies to the transform of equations (III)-(VI).

Applying the same descriptor extraction process to the $C_b$ and $C_r$ channels of $F_i$ gives the descriptors $V^{Cb}_{i(64 \times 64)}$, ..., $V^{Cb}_{i(2 \times 2)}$ and $V^{Cr}_{i(64 \times 64)}$, ..., $V^{Cr}_{i(2 \times 2)}$. All these scale-specific channel-specific descriptors capture the image's spatially sensitive colour content and interrelation information at multiple scales and across multiple channels.

In the previous descriptions, $F_i$ is assumed to be in the $YC_bC_r$ colour space and all the channels are used in the extraction of the descriptors. Alternative implementations may represent the image in a new colour space before the calculation of the descriptors and/or use only a subset of the colour planes in the calculation of its descriptors.

In the previous descriptions, the descriptors across the different colour channels of $F_i$ are calculated at the same scales. In alternative implementations this need not be so. For example, an alternative embodiment of the invention calculates the Y channel descriptors at more scales and/or different scales than the $C_b$ and/or $C_r$ channel descriptors. Such fine tuning results in a better adaptation to a specific image or video material and can improve the performance.

In the previous descriptions, the same neighbourhood window and descriptor extraction process is used for all the colour channels of $F_i$. In alternative implementations this need not be so. Alternative embodiments may employ different neighbourhood parameters and/or descriptor extraction processes for each channel. For example, an alternative embodiment of the invention uses a fast descriptor extraction process for the $C_b$ and $C_r$ channels and a slower but more powerful descriptor extraction process for the Y channel. Such fine tuning results in a better adaptation to a specific image or video material and can improve the performance of a system.

In one embodiment of the invention, some or all of the descriptor elements are represented as real numbers with an integer and a fractional part. In another embodiment of the invention some or all of the descriptor elements are represented in integer form, for example by truncating or by rounding their fractional part. In yet another embodiment of the invention some or all of the descriptor elements are represented in integer form by scaling. For example, equations (1)-(4) produce real numbers where the fractional part can take only three values, namely 0.25, 0.50 and 0.75. Multiplying the descriptor element $\chi_1$ with the value 4 and the descriptor elements $\chi_2$, $\chi_3$ and $\chi_4$ with the value 2 will result in integer representations without any information loss. In yet another embodiment of the invention some or all of the descriptor elements are represented in integer form by any means and are then quantised to shorter values, for example 3 or 4 bits long.

Thus, in one embodiment of the invention, image $F_i$ is represented by its descriptors $V^{C1}_{i(C1SCq)}, \ldots, V^{C1}_{i(C1SC1)}$, $V^{C2}_{i(C2SCq)}, \ldots, V^{C2}_{i(C2SC1)}, \ldots, V^{Cp}_{i(CpSCq)}, \ldots, V^{Cp}_{i(CpSC1)}$ where C1, C2, ..., Cp are a first, second and $p^{th}$ colour channel of $F_i$, C1SCq is the highest descriptor scale for channel C1, C1SC1 is the lowest descriptor scale for channel C1, C2SCq is the highest descriptor scale for channel C2, C2SC1 is the lowest descriptor scale for channel C2, and so on. All these scale-specific channel-specific descriptors capture the image's spatially sensitive colour content and interrelation information at multiple scales (preferably more than one) and across multiple channels (preferably more than one).

Figure 4:
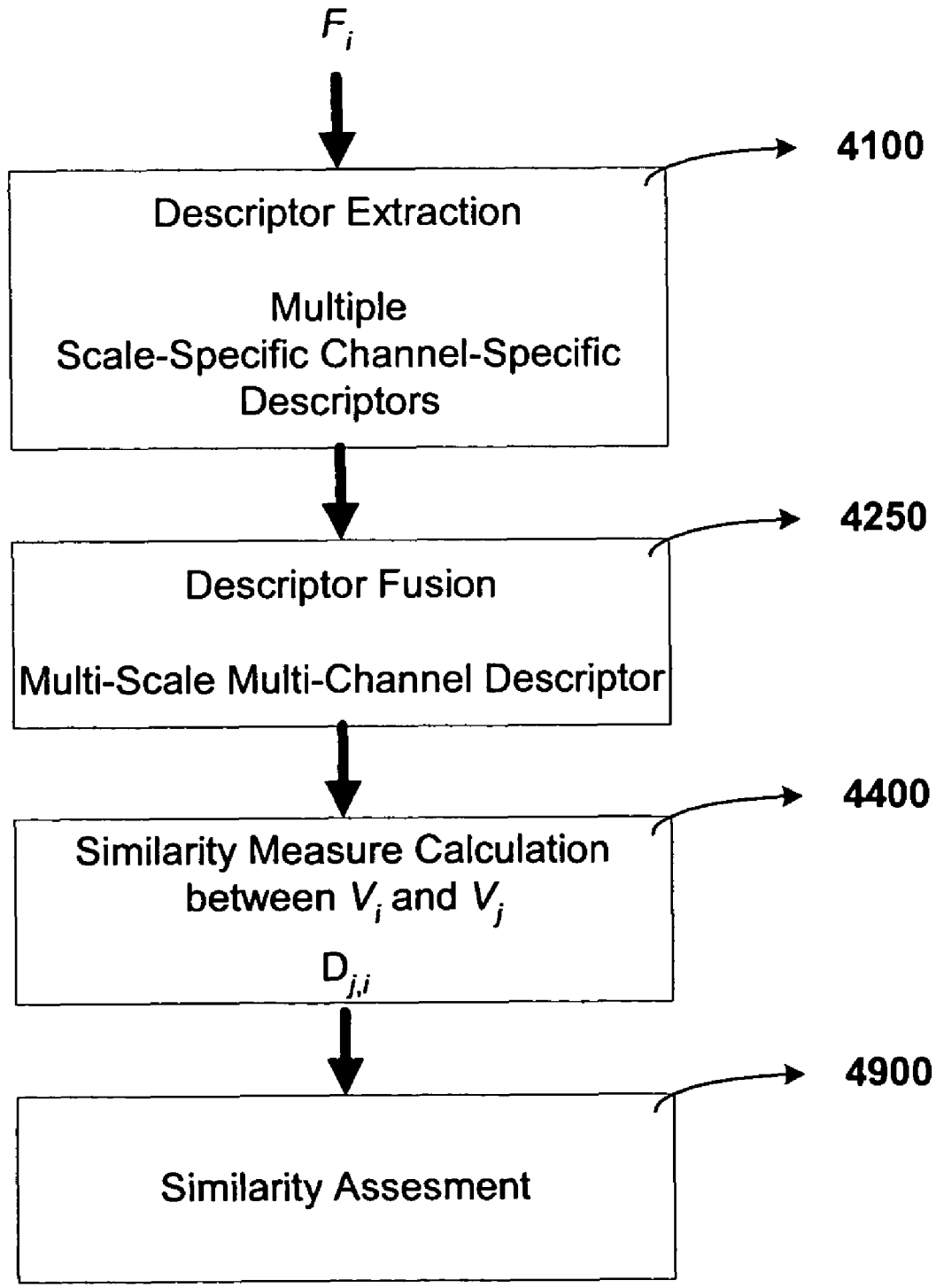
FIG. 4 is a flow diagram for comparing a plurality of images according to an embodiment of the invention.

Such descriptors are then fused, i.e. concatenated, into a single descriptor for subsequent processing. This is illustrated in FIG. 4.

In that embodiment, in step 4100, scale-specific channel-specific descriptors are extracted as previously explained. In step 4250, these descriptors are fused into a multi-scale multi-channel descriptor $V_i$. In step 4400, the descriptors $V_i$ and $V_j$ are used for the calculation of a similarity measure $D_{j,i}$ between images $F_i$ and $F_j$. In step 4900, the similarity measure is used in the assessment of the similarity or dissimilarity of the two images.

The various steps of this process will now be examined more closely.

In step 4400, there are many options for the calculation of a similarity measure. For example, in one embodiment of the invention the L1 distance between two descriptors $V_i$ and $V_j$, of n elements each, may be calculated as the similarity measure, given by $$L1_{j,i} = \sum_{l=0}^{n} |V_j(l) - V_i(l)| \quad (10)$$

The invention outlined here comprises using the image descriptors for the calculation of a similarity measure, comprising at least two values, between images.

The L1 distance of equation (10) for the calculation of descriptor distances relates to only one possible implementation of the invention. An alternative implementation replaces equation (10) with equation (11) below, which calculates the L2 distance $$L2_{j,i} = \sqrt{\sum_{l=0}^{n} (|V_j(l) - V_i(l)|)^2} \quad (11)$$

There is great variety of such distance metrics available in the relevant literature.

Furthermore, an alternative implementation replaces equation (10) with equation (12) below, which calculates the weighted L1 distance $$L1_{j,i} = \sum_{l=0}^{n} (w(l) \cdot |V_j(l) - V_i(l)|) \quad (12)$$

where w(l) is the weighting factor for the $l^{th}$ descriptor elements. Furthermore, the application of weights may also be used in conjunction with the L2 distance of equation (11) or any other suitable distance metric available in the literature.

There are many options for the processing of the similarity measure. In one embodiment of the invention, in step 4900 a thresholding function is applied to the similarity measure $D_{j,i}$. That is, for a threshold value thr, if $$D_{j,i} \geq \text{thr} \quad (13)$$

the two images are deemed dissimilar and a decision "dissimilar" is made in step 4900. Otherwise, the two images are deemed similar and a decision "similar" is produced.

The embodiment outlined here comprises using said similarity measure, comprising at least two values, to ascertain the similarity or dissimilarity between images.

The thresholding scheme outlined above results in step 4900 producing a binary decision, for example "1" denoting "similar" and "0" denoting "dissimilar". In another embodiment of the invention, the decision of step 4900 is not binary but comprises at least three values. In such a case, the term "likelihood measure" is better than the term "decision" to describe the result of processing step 4900. For example, in one embodiment of the invention, step 4900 uses three thresholds. If a similarity measure is below a first threshold, a similarity likelihood measure of "0", denoting "dissimilar" is produced. If a similarity measure is above the first threshold but below a second threshold, which is higher than the first threshold, a similarity likelihood measure of "1", denoting "probably dissimilar" is produced. If a similarity measure is above the second threshold but below a third threshold, which is higher than the second threshold, a similarity likelihood measure of "2", denoting "probably similar" is produced. If a similarity measure is above the third threshold, a similarity likelihood measure of "3", denoting "similar" is produced. In yet another embodiment of the invention, the likelihood measure is produced not through thresholding but by normalisation of the similarity measure to the fixed range, e.g. between 0 and 1.

In a preferred embodiment of the invention according to FIG. 4, step 4900 produces a binary decision or a multi-valued likelihood measure, where said likelihood measure might be the similarity measure produced in step 4400 after normalisation to a fixed range, e.g. between 0 and 1. In an alternative embodiment of the invention, step 4900 is not implemented at all, and the final result of the processing according to the invention is the unnormalised similarity measure produced by step 4400.

The semantics of the similarity assessment that is made in step 4900 depend on the application that the invention is implemented for.

In one embodiment of the invention, $F_i$ and $F_j$ are temporally ordered images. For example, they are frames of a video $F_z$, and the aim is to find whether a frame discontinuity exists between $F_j$ and $F_i$, such as a shot transition or lighting effect and the such. Then, the decision at step 4900 will be whether the similarity measure between $F_j$ and $F_i$ indicates such a frame discontinuity. Such a system would be used for the purpose of segmenting a video. In such an application, the preferred output of step 4900 would be a binary decision, allowing the segmentation of the video.

In another embodiment of the invention $F_j$ and $F_i$ are individual images with no temporal ordering. For example, $F_j$ is an image of a set of images $F_z$ and $F_i$ is another image, either from inside or outside $F_z$, and the aim is to find those images in $F_z$ that are similar to $F_i$. Then, the decision of step 4900 will be whether the similarity measure between $F_j$ and $F_i$ indicates that the images are similar. Such a system would be used for image retrieval by query or for the categorisation of images in a database. In such an application, the preferred output of step 4900 would be a multi-valued likelihood measure, preferable the similarity measure normalised to a fixed range, instead of a binary decision, allowing the creation of a ranked list of similar images.

The above are but two possible applications of the invention.

In one embodiment of the invention, one or both of the descriptors $V_i$ and $V_j$ of step 4400 represent not images but groups of images.

For example, in one embodiment of the invention $V_j$ is a function, such as the average or the median, of the descriptors $V_{j1}, V_{j2}, \ldots, V_{jg}$ of images $F_{j1}, F_{j2}, \ldots, F_{jg}$ which form the cluster of images $F_j$. For example, $F_j$ could be a cluster of images representing cars. For an image $F_i$, ascertaining the similarity between descriptors $V_i$ and $V_j$ will then reveal not whether $F_i$ is similar to a particular image, but whether it is similar to a particular class or cluster of images. A set of images $F_z$ could contain any number of such clusters, and such a processing would reveal which particular cluster a given image matches best. Furthermore, a cluster may be represented not only by $V_j$, but also by other statistics such as the covariance matrix of the descriptors of its images, which allows the calculation of more complex similarity measures in step 4400, such as the Mahalanobis distance or the maximum likelihood measure.

In another embodiment of the invention for the segmentation of video, $V_j$ is a function, such as the average or the median, of the descriptors $V_{j1}, V_{j2}, \ldots, V_{jg}$ of frames $F_{j1}, F_{j2}, \ldots, F_{jg}$. These frames might all precede the frame $F_i$, or they might all follow it, or some may precede it and some may follow it.

The embodiment outlined here comprises using said similarity measure, comprising at least two values, to ascertain the similarity or dissimilarity between images. Thus, In the previous embodiments of the invention for video segmentation, in step 4900, the similarity measure between two frames $F_i$ and $F_j$ is used for the detection of frame discontinuities. An alternative embodiment of the invention uses not only this similarity measure but also the similarity measures between frames around frames $F_i$ and $F_j$.

For example, in one embodiment of the invention j=i−1 and the detection of frame discontinuities relies on the similarity measures $D_{i+k-1,i+k} \forall k \in [-t_1, t_2]$. In a preferred embodiment, $t1=t2=t$. Thus, the frames $F_{i+k}$ form a temporal window centred on frame $F_i$. Then, a frame discontinuity is detected between $F_{i-1}$ and $F_i$ if and only if $$D_{i-1,i} \geq D_{i+k-1,i+k} \quad \forall\, k \in [-t, t], k \neq 0 \text{ and} \tag{14}$$

$$\frac{D_{i-1,i}}{D_{i+p-1,i+p}} \geq thr \text{ with } D_{i+p-1,i+p} \geq D_{i+k-1,i+k} \; \forall\, k, \tag{15}$$

$$p \in [-t, t], k, p \neq 0$$

According to equations (14) and (15), each similarity measure $D_{i-1,i}$ is considered inside a temporal window of size 2t+1, centred on $D_{i-1,i}$. Then, a discontinuity is detected between frames $F_{i-1}$ and $F_i$ if and only if $D_{i-1,i}$ is the largest distance within the temporal window and at least thr times larger than the second largest distance inside the temporal window. Such a temporally adaptive scheme aims in reducing the number of false detections resulting from high motion levels between frames. There are several such schemes of processing such a time series for the detection of frame discontinuities.

It should be clearly understood that in a preferred embodiment of the invention, descriptors are extracted at many scales and across multiple channels. However, in alternative embodiments of the invention this need not be so. For example, in one embodiment of the invention, descriptors are extracted at multiple scales but for only a single channel. In another embodiment of the invention, descriptors are extracted for a single scale, but across multiple channels. In yet another embodiment of the invention, descriptors are extracted at a single scale and for a single channel.

Furthermore, in the previous embodiments the processing of all pairs of consecutive frames was considered for the detection of frame discontinuities. Alternative embodiments may process frames more sparsely. An alternative embodiment processes only every $4^{th}$ frame, while yet another embodiment processes only every $16^{th}$ frame. Such enhancements further increase the speed of a video segmentation system.

Furthermore, the above descriptions relate to the processing of uncompressed digital video, where each frame is represented by its pixel values. The invention can also be applied directly to MPEG compressed video without decompression.

The nature of MPEG video is well known to those skilled in the art and is expertly described in the book "The MPEG Handbook" by John Watkinson, "The MPEG Handbook: MPEG-1, MPEG-2, MPEG-4", Focal Press, Oxford 2001, ISBN:0-240-51656-7.

In one embodiment of the invention for MPEG compressed video, only the I frames of the video are processed. More specifically, only the DC representations of the I frames are processed, i.e. for each block of 8×8 pixels, only the DC component of its DCT transform is taken. In effect, the DC representation of an I frame is simply a resampled version of the original frame before its compression using 8×8 block averaging. Since DC components can be retrieved directly from the compressed video stream without decompression, it is evident that the invention is directly applicable for the processing of the I frames of MPEG compressed video.

The invention can be implemented for example in a computer system, with suitable software and/or hardware modifications. For example, the invention can be implemented using a computer or similar device having control or processing means such as a processor or control device, data storage means, including image storage means, such as memory, magnetic storage, CD, DVD etc, data output means such as a display or monitor or printer, data input means such as a keyboard, and image input means such as a scanner, or any combination of such components together with additional components. Aspects of the invention can be provided in software and/or hardware form, or in an application-specific apparatus or application-specific modules can be provided, such as integrated circuits. Components of a system in an apparatus according to an embodiment of the invention may be provided remotely from other components, for example, over the internet.

Figure 5:
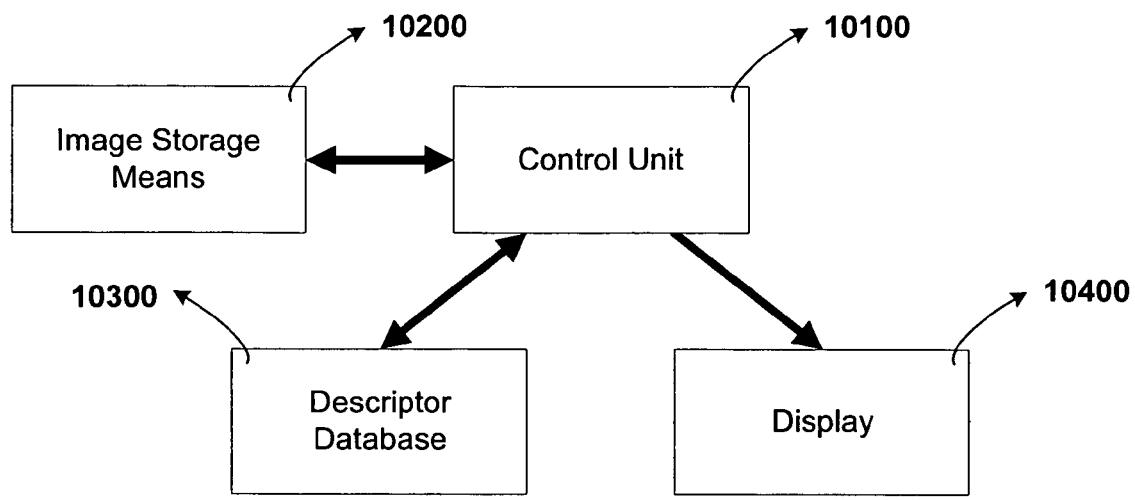
FIG. 5 is a schematic illustration of a processing device suitable for the implementation of embodiments of the invention.

A block diagram of a suitable apparatus in the form of a computer system is shown in FIG. 5 where a control unit 10100 is connected to an image storage means 10200, a descriptor storage means 10300 and a display 10400. The image storage device 10200 stores data corresponding to the images to be represented or compared according to the aforementioned embodiments. This may be data corresponding to a single image, a plurality of images, clusters of images, sequences of images or an entire image database. The descriptor storage means 10300, which may be a database, stores all derived descriptors including sub-descriptors calculated by the control unit 10100. Results of the operation of the control unit are displayed to a user on display 10400.

The terms "scale" and "resolution" are used interchangeably herein. A region of an image can mean the whole image or part of an image.

The invention claimed is:

1. A method of representing an image comprising using a processor to perform the steps of:
    deriving at least one descriptor based on colour information and colour interrelation information for at least one region of the image, the descriptor being derived using values of pixels in said region and having at least two descriptor elements that are functions of values of pixels in said region, wherein at least one of said descriptor elements for said region is derived using only a subset of pixels in said region, wherein deriving said at least one descriptor includes performing the steps of:
    identifying said region of the image;
    determining the values of pixels in said region;
    performing a first calculation on the pixel values of said region to determine a first value that represents colour information of said region;
    performing a second different calculation on the pixel values of said region to determine a second value that represents colour interrelation information of said region, wherein at least one of said first and second calculations involves examining only a subset of pixels in the region; and forming a descriptor containing at least said first and second values as said at least two descriptor elements.

2. The method of claim 1 wherein each of a plurality of descriptors elements for a region are derived using only a subset of pixels in said region.

3. The method of claim 1 or claim 2 wherein all the descriptor elements for a region are derived using only a subset of pixels in said region.

4. The method of claim 1 wherein the calculations used to derive the descriptor elements are such that the resulting number of descriptor elements is less than the number of pixels used to derive the descriptor elements.

5. The method of claim 1, wherein at least one descriptor element captures colour information.

6. The method of claim 1, wherein at least one descriptor element captures colour interrelation information.

7. The method of claim 1, wherein at least one descriptor element represents a pixel average for said region, or at least one descriptor element represents the difference function involving pixels in said region, or at least one descriptor element represents a pixel value range in said region.

8. The method of claim 1 wherein at least one descriptor element represents a difference between two pixel values, or a difference between two sums of pixel values.

9. The method of claim 7 wherein the descriptor elements are derived using equations of the form of the following equations 1 to 4:

$$\chi_1 = \qquad\qquad\qquad\qquad\qquad\qquad\qquad\qquad (1)$$
$$(F^Y_{i(64\times 64)}(0,0) + F^Y_{i(64\times 64)}(1,0) + F^Y_{i(64\times 64)}(0,1) + F^Y_{i(64\times 64)}(1,1))/4$$

$$\chi_2 = (F^Y_{i(64\times 64)}(0,0) - F^Y_{i(64\times 64)}(1,0))/2 \qquad (2)$$

$$\chi_3 = (F^Y_{i(64\times 64)}(1,0) - F^Y_{i(64\times 64)}(1,1))/2 \qquad (3)$$

$$\chi_4 = (F^Y_{i(64\times 64)}(1,1) - F^Y_{i(64\times 64)}(0,1))/2 \qquad (4)$$

for any scale of said image.

10. The method of claim 7 wherein the descriptor elements are derived using equations of the form of the following equations I and II:

$$\psi_1 = \qquad\qquad\qquad\qquad\qquad\qquad\qquad\qquad (I)$$
$$(F^Y_{i(64\times 64)}(0,0) + F^Y_{i(64\times 64)}(1,0) + F^Y_{i(64\times 64)}(0,1) + F^Y_{i(64\times 64)}(1,1))/4$$

$$\psi_2 = \qquad\qquad\qquad\qquad\qquad\qquad\qquad\qquad (II)$$
$$\max(F^Y_{i(64\times 64)}(0,0), F^Y_{i(64\times 64)}(1,0), F^Y_{i(64\times 64)}(0,1), F^Y_{i(64\times 64)}(1,1)) -$$
$$\min(F^Y_{i(64\times 64)}(0,0), F^Y_{i(64\times 64)}(1,0), F^Y_{i(64\times 64)}(0,1), F^Y_{i(64\times 64)}(1,1)),$$

or the following equations III to VI:

$$\phi_1 = \qquad\qquad\qquad\qquad\qquad\qquad\qquad\qquad (III)$$
$$(F^Y_{i(64\times 64)}(0,0) + F^Y_{i(64\times 64)}(1,0) + F^Y_{i(64\times 64)}(0,1) + F^Y_{i(64\times 64)}(1,1))/4$$

$$\phi_2 = (F^Y_{i(64\times 64)}(0,0) - F^Y_{i(64\times 64)}(1,0))/2 \qquad (IV)$$

$$\phi_3 = (F^Y_{i(64\times 64)}(0,0) - F^Y_{i(64\times 64)}(1,1))/2 \qquad (V)$$

$$\phi_4 = (F^Y_{i(64\times 64)}(0,0) - F^Y_{i(64\times 64)}(0,1))/2, \qquad (VI)$$

or the following equations 6 to 9:

$$\psi_1 = (F^Y_{i(64\times 64)}(0,0) + F^Y_{i(64\times 64)}(1,0) + F^Y_{i(64\times 64)}(2,0) + F^Y_{i(64\times 64)}(3,0) + \qquad (6)$$
$$F^Y_{i(64\times 64)}(0,1) + F^Y_{i(64\times 64)}(1,1) + F^Y_{i(64\times 64)}(2,1) +$$
$$F^Y_{i(64\times 64)}(3,1) + F^Y_{i(64\times 64)}(0,2) + F^Y_{i(64\times 64)}(1,2) +$$
$$F^Y_{i(64\times 64)}(2,2) + F^Y_{i(64\times 64)}(3,2) + F^Y_{i(64\times 64)}(0,3) +$$
$$F^Y_{i(64\times 64)}(1,3) + F^Y_{i(64\times 64)}(2,3) + F^Y_{i(64\times 64)}(3,3))/16$$

$$\psi_2 = (F^Y_{i(64\times 64)}(0,0) + F^Y_{i(64\times 64)}(1,0) + F^Y_{i(64\times 64)}(2,0) + F^Y_{i(64\times 64)}(3,0) - \qquad (7)$$
$$F^Y_{i(64\times 64)}(0,1) - F^Y_{i(64\times 64)}(1,1) - F^Y_{i(64\times 64)}(2,1) -$$
$$F^Y_{i(64\times 64)}(3,1) - F^Y_{i(64\times 64)}(0,2) - F^Y_{i(64\times 64)}(1,2) -$$
$$F^Y_{i(64\times 64)}(2,2) - F^Y_{i(64\times 64)}(3,2) + F^Y_{i(64\times 64)}(0,3) +$$
$$F^Y_{i(64\times 64)}(1,3) + F^Y_{i(64\times 64)}(2,3) + F^Y_{i(64\times 64)}(3,3))/16$$

$$\psi_3 = (F^Y_{i(64\times 64)}(0,0) - F^Y_{i(64\times 64)}(1,0) - F^Y_{i(64\times 64)}(2,0) + F^Y_{i(64\times 64)}(3,0) + \qquad (8)$$
$$F^Y_{i(64\times 64)}(0,1) - F^Y_{i(64\times 64)}(1,1) - F^Y_{i(64\times 64)}(2,1) +$$
$$F^Y_{i(64\times 64)}(3,1) + F^Y_{i(64\times 64)}(0,2) - F^Y_{i(64\times 64)}(1,2) -$$
$$F^Y_{i(64\times 64)}(2,2) + F^Y_{i(64\times 64)}(3,2) + F^Y_{i(64\times 64)}(0,3) -$$
$$F^Y_{i(64\times 64)}(1,3) - F^Y_{i(64\times 64)}(2,3) + F^Y_{i(64\times 64)}(3,3))/16$$

$$\psi_4 = \max(F^Y_{i(64\times 64)}(0,0), F^Y_{i(64\times 64)}(1,0), F^Y_{i(64\times 64)}(2,0), F^Y_{i(64\times 64)}(3,0), \qquad (9)$$
$$F^Y_{i(64\times 64)}(0,1), F^Y_{i(64\times 64)}(1,1), F^Y_{i(64\times 64)}(2,1), F^Y_{i(64\times 64)}(3,1),$$
$$F^Y_{i(64\times 64)}(0,2), F^Y_{i(64\times 64)}(1,2), F^Y_{i(64\times 64)}(2,2), F^Y_{i(64\times 64)}(3,2),$$
$$F^Y_{i(64\times 64)}(0,3), F^Y_{i(64\times 64)}(1,3), F^Y_{i(64\times 64)}(2,3), F^Y_{i(64\times 64)}(3,3)) -$$
$$\min(F^Y_{i(64\times 64)}(0,0), F^Y_{i(64\times 64)}(1,0), F^Y_{i(64\times 64)}(2,0), F^Y_{i(64\times 64)}(3,0),$$
$$F^Y_{i(64\times 64)}(0,1), F^Y_{i(64\times 64)}(1,1), F^Y_{i(64\times 64)}(2,1), F^Y_{i(64\times 64)}(3,1),$$
$$F^Y_{i(64\times 64)}(0,2), F^Y_{i(64\times 64)}(1,2), F^Y_{i(64\times 64)}(2,2), F^Y_{i(64\times 64)}(3,2),$$
$$F^Y_{i(64\times 64)}(0,3), F^Y_{i(64\times 64)}(1,3), F^Y_{i(64\times 64)}(2,3), F^Y_{i(64\times 64)}(3,3))$$

for any scale of said image.

11. The method of claim 1 wherein descriptors are produced for a plurality of over-lapping or non-overlapping regions of an image.

12. The method of claim 1 comprising
processing the image to produce a plurality of representations of the image at a plurality of scales; and
deriving descriptors for said plurality of scales, or processing the image for each of a plurality of colour channels and deriving descriptors for each of said channels.

13. The method of claim 12 wherein the same scales are used for different colour channels.

14. The method of claim 12 wherein different scales are used for different channels.

15. The method of claim 1 wherein different processes for deriving descriptors are used for one or more of : different regions, different scales, and different colour channels.

16. The method of claim 1 wherein the descriptors are derived directly from MPEG encoded I frames without decoding.

17. The method of claim 1 comprising associating a plurality of descriptors for an image to form a single descriptor.

18. A method of representing a group of images, comprising deriving a representation of each image using the method of claim 1, and using said representations to represent said group of images.

19. The method of claim 18 comprising deriving a function of said representations to represent the group of images.

20. The method of claim 19 wherein said function comprises a statistical measure.

21. A representation of an image or group of images derived using a method of claim 1.

22. A method of comparing images or groups of images comprising comparing representations according to claim 21.

23. The method of claim 22 comprising comparing images which are part of a sequence of images and wherein the result of the comparison is used to determine whether a frame discontinuity or event has occurred between the images.

24. The method of claim 22 used for image retrieval.

25. A method of encoding an image or group of images using the method of claim 1.

26. A method of decoding an image or sequence of images encoded using the method of claim 25.

27. Use of data encoded according to the method of claim 25, by means of transmission, relay or reception.

28. An apparatus for representing an image or group of images according to the method of claim 1.

29. Apparatus for comparing images or groups of images according to the method of claim 1.

30. The apparatus of claim 28 or claim 29 comprising storage means for storing image data or image descriptors, and processing means for executing said method.

31. A computer-readable storage medium encoded with a computer program for executing the method of claim 1, 22, 25, or 26.

32. The method of claim 1, wherein the at least one descriptor element comprises a plurality of descriptor elements including a colour information element and a colour interrelation information element, wherein the colour interrelation information element is derived using a function of pixels values of a pixel neighbourhood in said region, the function representing an interrelationship between pixel values in said neighbourhood.

* * * * *